(12) United States Patent
Lee

(10) Patent No.: US 12,553,774 B2
(45) Date of Patent: Feb. 17, 2026

(54) METHOD TO GENERATE REFERENCE EOTFS FOR DISPLAY MEASUREMENTS

(71) Applicant: ATI Technologies ULC, Markham (CA)

(72) Inventor: Keith Lee, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/619,931

(22) Filed: Mar. 28, 2024

(65) Prior Publication Data
US 2025/0305883 A1    Oct. 2, 2025

(51) Int. Cl.
*G09G 3/20* (2006.01)
*G01J 3/50* (2006.01)

(52) U.S. Cl.
CPC ............ *G01J 3/506* (2013.01); *G09G 3/2007* (2013.01); *G09G 2320/0626* (2013.01); *G09G 2320/0673* (2013.01)

(58) Field of Classification Search
CPC ............... G01J 3/506; G09G 3/2007; G09G 2320/0626; G09G 2320/0673
See application file for complete search history.

(56) References Cited

U.S. PATENT DOCUMENTS

| 2017/0124983 | A1 | 5/2017 | Atkins et al. |
| 2017/0263211 | A1 | 9/2017 | Miller et al. |
| 2018/0122058 | A1* | 5/2018 | Kang ............... G06T 7/136 |
| 2020/0045341 | A1 | 2/2020 | Koo et al. |
| 2023/0062367 | A1* | 3/2023 | Wang ............... G09G 5/10 |

FOREIGN PATENT DOCUMENTS

| CN | 115734040 A | * | 3/2023 |
| CN | 115776546 A | * | 3/2023 |

* cited by examiner

*Primary Examiner* — Kenneth Bukowski
(74) *Attorney, Agent, or Firm* — Kowert, Hood, Munyon, Rankin & Goetzel, P.C.; Rory D. Rankin

(57) ABSTRACT

An apparatus and method for adjusting reference transfer functions used during a certification process. In various implementations, a display testing system includes multiple display devices under test and a measurement device. An optics capturing device sends information to the measurement device based on light information received from a display device under test. For display devices that regulate power consumption based on average picture level (APL) of the test image, the measurement device generates a new reference electro-optical transfer function (EOTF) based at least upon the varying peak luminance values based on changing APLs. For display devices that do not provide a minimum luminance of 0 nits at Perceptual Quantizer (PQ) code 0 of the ideal PQ EOTF, the measurement device generates a new reference EOTF based at least in part on using electrical-electrical transfer function (EETF) equations.

20 Claims, 11 Drawing Sheets

METHOD TO GENERATE REFERENCE EOTFS FOR DISPLAY MEASUREMENTS

BACKGROUND

Description of the Relevant Art

A variety of computing systems include display devices to display images, video streams, and data. These systems typically include functionality for generating and manipulating images and video information. Video processing algorithms used by these computing systems are complex and include many different functions. Computing systems use advanced processors to satisfy the high computation demands. The video processing complexity increases as display resolution increases and display refresh rates increase. The display devices also include advanced circuitry to provide increased resolution and refresh rates. The image to view on the screen of the display device is provided by a video frame. It is common for regions of the video frame to include multiple gray levels. The intensity of light emitted in a particular direction from the screen surface of a display device per unit area is referred to as "luminance." One unit used to measure luminance is a candela per square meter. A candela per square meter is also referred to as a "nit".

Based on studies of human vision, it has been found that the human eye has a non-linear sensitivity to luminance. The human eye is most sensitive to changes at lower gray scale, or darker levels, of the range of luminance (range of brightness). To model this non-linear sensitivity, a non-linear encoding technique is used. For example, gamma correction and transfer functions can be used to manipulate image output. Gamma correction generally adjusts the perceived brightness or contrast of an image to compensate for discrepancies between an input signal and desired output. An electro-optical transfer function (EOTF) maps pixel values to light intensity values displayed on a display device. Various EOTFs attempt to have adjacent codes provide luminance values that include a minimum step in perceivable brightness by the human eye. Part of the certification process of a display device relies on the luminance output of the display device compared to the luminance output of a chosen EOTF for selected codes.

Some display devices fail during the certification process due to not providing a black level of 0 nits. Particular types of display devices regulate power consumption based on the type of image to be displayed on the screen, which causes a change in the peak luminance of the display device. These display devices fail during the certification process due to these display devices changing the peak luminance that they provide in order to stay within a targeted power envelope or power consumption limit. Some of these display devices that fail the certification process receive good reviews within the market.

In view of the above, efficient methods and mechanisms for adjusting reference transfer functions used during a certification process are desired.

Figure 1:
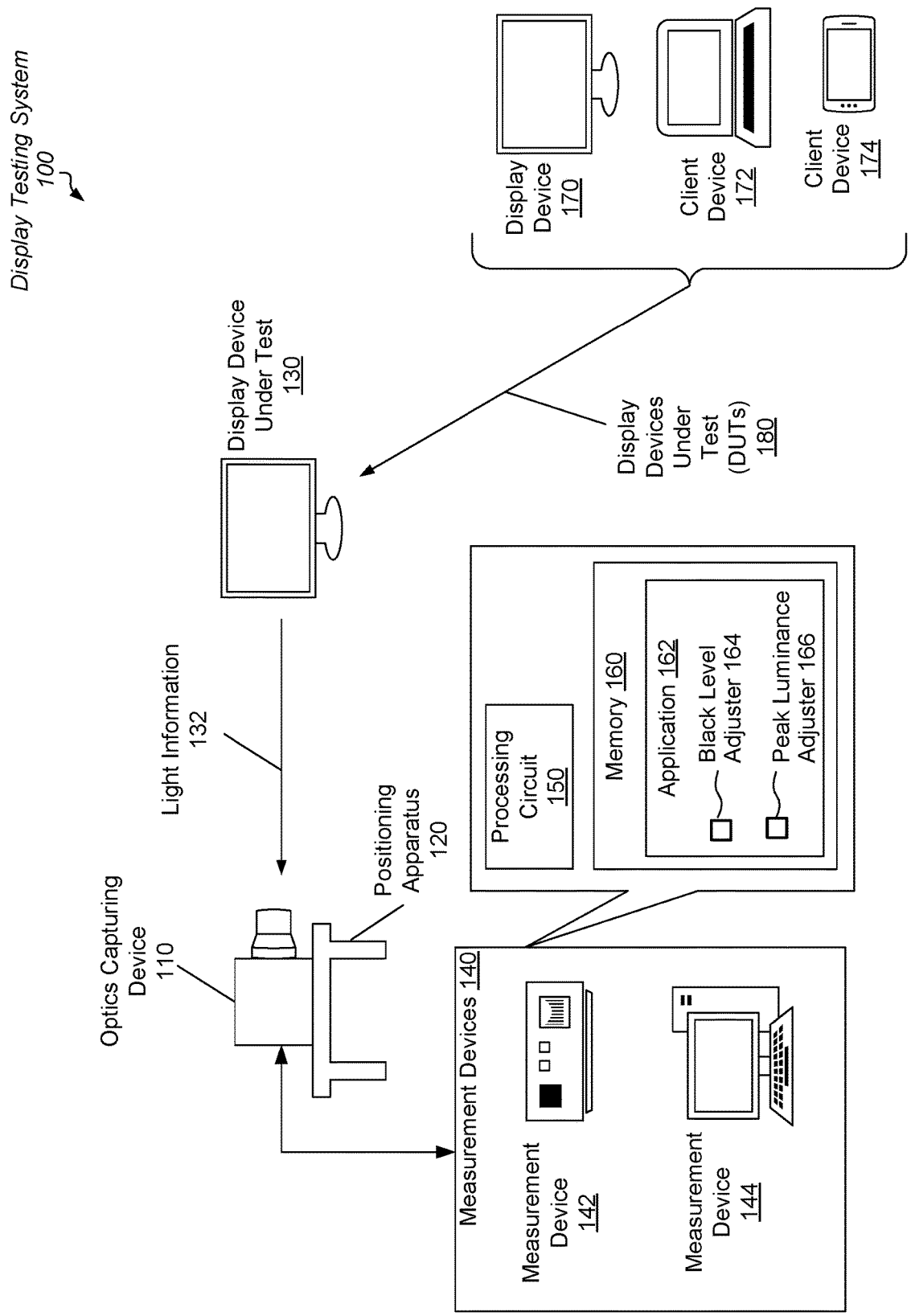
FIG. 1 is a generalized diagram of a display testing system that generates reference transfer functions used during a certification process.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for adjusting reference transfer functions used during a certification process are contemplated. In various implementations, a display testing system includes multiple display devices under test, an optics capturing device, and a measurement device. The optics capturing device sends information to the measurement device based on light information received from the display device. The measurement device selects a given average picture level (APL) of a test image to be displayed on a screen of the display device. The display device has multiple peak luminance values, each for a corresponding APL. In an implementation, the display device is an organic light-emitting diode (OLED) display type. The display device, which is an OLED display type, regulates power consumption based on the APL of the test image to be displayed on the screen. Therefore, the display device has multiple peak luminance values, each for a corresponding APL.

The term "average picture level (APL)" refers to the brightness of the image averaged across the whole screen. In various implementations, the APL is set by an average digital code used to represent the one or more color values presented on a screen of a display device. When the screen presents a full screen (100% area of the screen) with a white level, and the data size (bit depth) of the code values is 8 bits, then the average code value is the maximum code value of 255. The APL is 100%, or the brightness of the image averaged across the whole screen is 100% in this case. When the screen presents a half screen (50% area of the screen) with a white level, and a half screen (50% area of the screen) with a black level, and the data size (bit depth) of the code values is 8 bits, then the average code value is 128, which is the average of code value 0 and code value 255. The APL is 50%, or the brightness of the image averaged across the whole screen is 50% in this case.

The measurement device selects, from the multiple peak luminance values of the display device, a given peak luminance value corresponding to the given APL. The measurement device retrieves an electro-optical transfer function (EOTF) output based at least in part on the given APL. One of a variety of types of EOTF can be used to generate luminance values based on code values. Gamma correction and use of a Perceptual Quantizer (PQ) EOTF are two examples of manipulating image output. Further details of the types of EOTFs are provided in the further description of FIGS. 1-11. The measurement device generates a first luminance value by modifying the EOTF output using the given peak luminance value. The measurement device generates a difference between the first luminance value and a second luminance value generated by the display device. The measurement device stores a pass or fail result based on whether the difference exceeds a threshold.

Due to some display devices provide a non-zero luminance value for PQ code 0, in some implementations, the measurement device uses electrical-electrical transfer function (EETF) equations based on at least the ideal PQ EOTF to generate a new reference transfer function during the certification process. In some implementations, the EETF equations are equations from the Recommendation ITU-R BT.2390-7. Further details of these techniques to generate new reference transfer functions to use during a certification process are provided in the following description of FIGS. 1-11.

Referring to FIG. 1, a generalized diagram is shown of a display testing system 100 that adjusts reference transfer functions used during a certification process. As shown, the display testing system 100 includes the display device under test (DUT) 130 that provides light information 132 to the optics capturing device 110. The positioning apparatus 120 adjusts the position of the optics capturing device 110, which changes the distance between the optics capturing device 110 and the display DUT 130. After capturing the light information 132, optics capturing device 110 provides information to the measurement devices 140. Measurement devices 140 determine whether the display DUT 130 passes or fails tests during a certification process. The display DUT 130 is one of multiple display DUTs 180 that are used in the certification process.

The display DUTs 180 include the display DUT 130 and the display DUTs 170, 172 and 174. Although four display devices under test are shown, the display testing system 100 can include any number of display devices under test. Each of the display DUTs 130, 170, 172 and 174 is representative of one of a variety of types of display devices used by a variety of computing devices and computing systems. For example, the display DUTs 180 can be used by a desktop computer, a laptop computer, a smartphone, a smartwatch, a television, a tablet computer, and so forth.

Examples of the display types used by the display DUTs 180 are a liquid crystal display (LCD) type, a high dynamic range (HDR) display type, an organic light-emitting diode (OLED) display type, an in-plane switching (IPS) display type, a plasma flat panel display (FPD) type, and so on. Optics capturing device 110 receives the light information 132 from the display DUT 130. Examples of optics capturing device 110 are a colorimeter and a spectroradiometer. In some implementations, the optics capturing device 110 is one of a variety of types of an optical probe with a diffusor for scattering incident light. The diffuser scatters any narrow light beams so as not to provide saturated information to measurement devices 140. Optics capturing device 110 captures and measures the light information 132 emitted in a particular direction from a particular location on the surface of display DUT 130. The light information 132 includes luminance that is measured in units of a candela per square meter, or a nit. In some implementations, one or more of a shield or a backlight is used by display testing system 100 to control measurements of luminance from display DUT 130.

In some implementations, optics capturing device 110 is mounted on or is placed in positioning apparatus 120. In an implementation, positioning apparatus 120 is a tripod. In other implementations, positioning apparatus 120 is one of a 3-axis positioner, a 2-axis goniometer, a 5-axis goniometer, and so forth. In yet other implementations, positioning apparatus 120 is a strap or other holder that permits contact measurements of display DUT 130. Measurement devices 140 send an indication of an assigned position to the positioning apparatus 120, which provides the assigned position. In an implementation, a user of one or more of the measurement devices 142 and 144 provides input indicating an updated position to a testing software product executed by the hardware of a corresponding processing circuit such as processing circuit 150. The user provides the input by running a script language program, by pressing buttons of a graphical user interface (GUI), by entering a particular command at a command prompt, or other.

To send information to measurement devices 140, optics capturing device 110 also includes an optical fiber such as a polymer fiber optic cable or other. Measurement device 142 is one of a variety of types of a meter that measures luminance. Examples of measurement device 142 are a spectrometer, a radiospectrometer, a colorimeter, a photometer, and so forth. Measurement device 144 is one of a variety of types of a desktop computer or a laptop computer with hardware, such as circuitry, which executes optics measurement (luminance measurement) software. At least one of measurement devices 142 and 144 includes processing circuit 150. In an implementation, processing circuit 150 is a general-purpose central processing unit (CPU) with one or more processing cores (or cores). In another implementation, processing circuit 150 is a parallel data processing circuit with a highly parallel data microarchitecture, such as a graphics processing unit (GPU). In yet other implementations, processing circuit 150 is a digital signal processing circuit (DSP), a field programmable gate arrays (FPGA), an application specific integrated circuits (ASIC), or other.

Memory 160 includes one or more memory devices, and these memory devices are representative of any number and type of memory devices. For example, these memory devices can include one of a variety of types of Dynamic Random Access Memory (DRAM), Static Random Access Memory (SRAM), NAND Flash memory, NOR flash memory, Ferroelectric Random Access Memory (FeRAM), and so forth. Memory 160 stores information provided by optics capturing device 110 and instructions of application 162. In various implementations, application 162 is one of a variety of types of optics measuring software used during a certification process of the multiple display DUTs 180.

The light output of display DUT 130 includes a combination of three primary colors, each represented by a particular number of bits. For example, the output can include an 8-bit value (or code) for the color red, an 8-bit code for the color green, and an 8-bit code for the color blue. Each 8-bit code provides one of 256 ($2^8$) shades or tones of a corresponding one of the red, green, and blue colors. Other data sizes of the code are possible and contemplated. Based on studies of human vision, it has been found that the human eye has a non-linear sensitivity to luminance. In other words, the human eye has a non-linear sensitivity to the perceived brightness of the screen of display DUT 130.

To model this non-linear sensitivity, a non-linear encoding mechanism is used. In various implementations, 8-bit codes are used to encode data. Other implementations use a different number of bits. In various implementations, gamma correction or use of a perceptual quantizer (PQ) is used to manipulate luminance values. These techniques provide an electro-optical transfer function (EOTF) that maps the codes to luminance levels. The EOTF attempts to have adjacent codes provide a minimum step in perceivable brightness by the human eye. With codes having a data size of 8 bits (range 0-255) versus 10 bits (range 0-1,023), each increase in luminance as the codes are incremented is more obvious than when a data size of 10 bits is used. A code value of 0 corresponds to a black level, which is ideally 0 nits, and a maximum code value corresponds to a white level, which is ideally a maximum luminance or the highest number of nits. In an implementation, 8-bit gamma correction provides a range of code values from 0 to 255 where the gamma code 0 corresponds to the black level of ideally 0 nits, and the gamma code 255 corresponds to the white level, or a maximum luminance.

Part of the certification process of the multiple display DUTs 180 relies on the luminance output of these display devices compared to the luminance output of a chosen EOTF for selected codes. For example, the chosen EOTF relies on the gamma correction or Perceptual Quantizer (PQ) used to provide a curve relating luminance values and digital code values. During the certification process, measurement devices 140 receive information from optics capturing device 110 that indicates the luminance provided by display DUT 130. When executing the instructions of application 162, one of measurement devices 142 and 144 compares the luminance provided by display DUT 130 with luminance provided by a curve generated by gamma correction and/or a curve generated by a PQ EOTF. When executing the instructions of application 162, one of measurement devices 142 and 144 generates an indication of passing or failing for display DUT 130 based on at least the performed comparisons. The pass/fail results are stored in memory 160 for later inspection.

In an implementation, a 10-bit PQ provides a range of code values from 0 to 1,023 where the PQ code value 0 corresponds to the black level of ideally 0 nits, and the PQ code value 1,023 corresponds to the white level, or a maximum luminance of 10,000 nits. It is known that presently used, or modern, display devices do not provide a maximum luminance of 10,000 nits. Unlike gamma correction, the PQ EOTF provides a fixed luminance value for each of the PQ code values. The luminance values are not adjusted based on the peak luminance of the display device. Further details of the adjustments of luminance values generated by other types of EOTFs (e.g., a gamma EOTF) are provided in the description of transfer functions 200 (of FIG. 2). Presently used display devices provide a maximum luminance of 400 nits to 1,500 nits with some display devices providing a maximum luminance of 2,000 nits. Accordingly, presently used display devices are not able to represent some of the luminance values that are encoded in a corresponding video frame. Therefore, a certification process does not fail display DUTs 180 for not having a maximum luminance of 10,000 nits at PQ code 1,023. To handle the situation of display DUTs providing a non-zero luminance at PQ code 0, a new reference EOTF is used. When executing the instructions of black level adjuster 164, processing circuit 150 generates the new reference EOTF.

When executing the instructions of black level adjuster 164, processing circuit 150 measures a transfer function generated by a display device under test (display DUT) and sends four inputs to EETF (electrical-electrical transfer function) equations where the four inputs include the peak luminance and minimum luminance of the original reference transfer function (ideal PQ EOTF) as reference levels and the peak luminance and minimum luminance of the display DUT as target display levels. In various implementations, the EETF equations are set by the Recommendation ITU-R BT.1886 or the Recommendation ITU-R BT.2390-11. In some implementations, the display DUT 130 is a high dynamic range (HDR) display type that does not provide a minimum luminance of 0 nits at PQ code 0. The output of the EETF equations provides another transfer function (luminance values versus code values). In some implementations, processing circuit 150 calculates an intersection PQ code value as the PQ code value where a difference between a luminance value of the original reference transfer function (ideal PQ EOTF) at the intersection PQ code value and a luminance value of the output of the EETF equations at the intersection PQ code value is less than a threshold.

Processing circuit 150 generates a new reference transfer function by inserting, in the new reference transfer function, luminance values from the original reference transfer function (ideal PQ EOTF) for code values greater than the intersection PQ code value. Processing circuit 150 continues to generate the new reference transfer function by inserting, in the new reference transfer function, luminance values generated by the EETF equations for PQ code values less than or equal to the intersection PQ code value. In an example, the intersection PQ code is 120. For PQ codes 121 to 1,023, processing circuit 150 inserts, in the new reference transfer function, luminance values from the original reference transfer function (ideal PQ EOTF). For PQ codes 0 to 120, processing circuit 150 inserts, in the new reference transfer function, luminance values generated by the EETF equations. For one or more PQ codes, processing circuit 150 compares the luminance values provided by the PQ EOTF of the display DUT 130 and the luminance values provided by the new reference EOTF. When executing the instructions of application 162, one of measurement devices 142 and 144 generates an indication of passing or failing for display DUT 130 based on the performed comparisons. The certification results, which include pass/fail results, are stored in memory 160 for later inspection.

In some implementations, display DUT 130 is an OLED display type, regulates power consumption based on the APL of the test image to be displayed on the screen. Therefore, the display device has multiple peak luminance values, each for a corresponding APL. When executing the instructions of peak luminance adjuster 166, processing circuit 150 selects, from the multiple peak luminance values of the display DUT 130, a given peak luminance value corresponding to a presently used APL. Processing circuit 150 retrieves an electro-optical transfer function (EOTF) output based at least in part on the presently used APL.

Processing circuit 150 generates the first luminance value by modifying the EOTF output using the given peak luminance value. Processing circuit 150 generates a difference between the first luminance value and a second luminance value generated by the display DUT 130. Processing circuit 150 stores a pass or fail result based on whether the difference exceeds a threshold. Further details of these steps are provided in the description of FIGS. 2-11.

Figure 2:
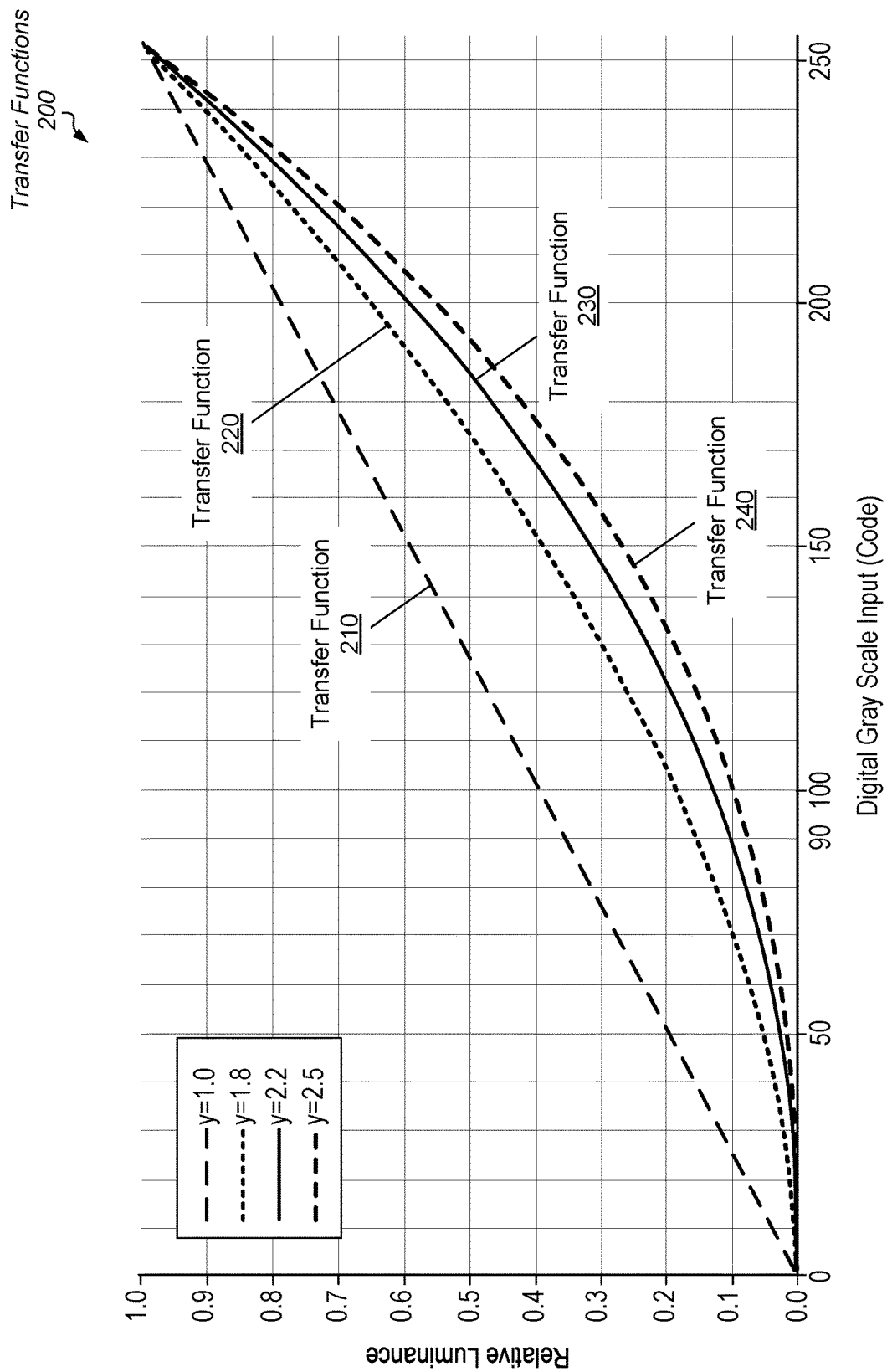
FIG. 2 is a generalized diagram of transfer functions.

Turning now to FIG. 2, a generalized diagram is shown of transfer functions 200. Transfer functions 200 includes electro-optical transfer functions (EOTFs) 210-240. Each of the transfer functions 210-240 is an electro-optical transfer function (EOTF) that converts a digital code expressing a digital gray scale input to a relative luminance value. Therefore, the x-axis of the graphs illustrating transfer functions 200 measures the digital code and the y-axis measures the relative luminance value. For the graphs illustrating transfer functions 200, the digital code has a data size of 8 bits, which provides a range of 256 ($2^8$) digital codes between 0 and 255. In other implementations, the digital code has another data size. The relative luminance values of a range of 0 nits to 1 nit. The maximum relative luminance of 1 nit corresponds to the maximum code value of 255. The minimum relative luminance of 0 nits corresponds to the minimum code value of 0. Between the minimum code value of 0 and the maximum code value of 255, the transfer functions 210-240 provide different relative luminance values.

Each of the transfer functions 210-240 is a gamma transfer function. Gamma encoding of images relies on the non-linear sensitivity to luminance by the human eye. The output of transfer functions 210-240 is the input of the transfer function raised to a power of gamma. The inputs to the transfer functions 210-240 are relative values converted from the input digital codes. For example, the digital code 90 is converted to 0.3529, since (90/255=0.3529). Transfer function 210 has a gamma value of 1.0. Therefore, at digital code 90, transfer function 210 provides a relative luminance of 0.3529 nits, which is 0.3529 raised to the power of 1. The upper left corner of the graphs illustrating transfer functions 200 shows the gamma values for the different transfer functions. Transfer function 220 has a gamma value of 1.8, transfer function 230 has a gamma value of 2.2, and transfer function 240 has a gamma value of 2.5. At the digital code 90, which is converted to 0.3529, transfer function 230 provides an output value of 0.3529 raised to the power of 2.2, which is a relative luminance value of 0.1011 nits. At the digital code 90, transfer function 220 provides an output value of 0.3529 raised to the power of 1.8, which is a relative luminance value of 0.1534 nits. At the digital code 90, transfer function 240 provides an output value of 0.3529 raised to the power of 2.5, which is a relative luminance value of 0.0740 nits.

Typically, computing systems use a gamma value of 0.45 when encoding images and use the reciprocal gamma value of 2.2 when decoding the encoded images. Therefore, many computing systems utilize transfer function 230 when decoding received digital codes to generate the luminance values. The relative luminance values of the graphs illustrating transfer functions 200 are multiplied by a maximum luminance value provided by a particular display device. For example, when a display device provides a maximum luminance value of 450 nits, the display device uses transfer function 230, and the digital code 90 is received for decoding, the display device provides an output luminance of 45.50 nits (450 maximum nits×0.1011 relative nits). However, some display devices have multiple peak luminance values, each for a corresponding APL. For example, an organic light-emitting diode (OLED) display device regulates power consumption based on the APL of the image to be displayed on the screen. When the APL is low, the OLED display device provides a higher maximum luminance value without consuming an appreciable amount of power. When the APL is high, the OLED display device provides a lower maximum luminance value to regulate the amount of power consumption.

Figure 3:
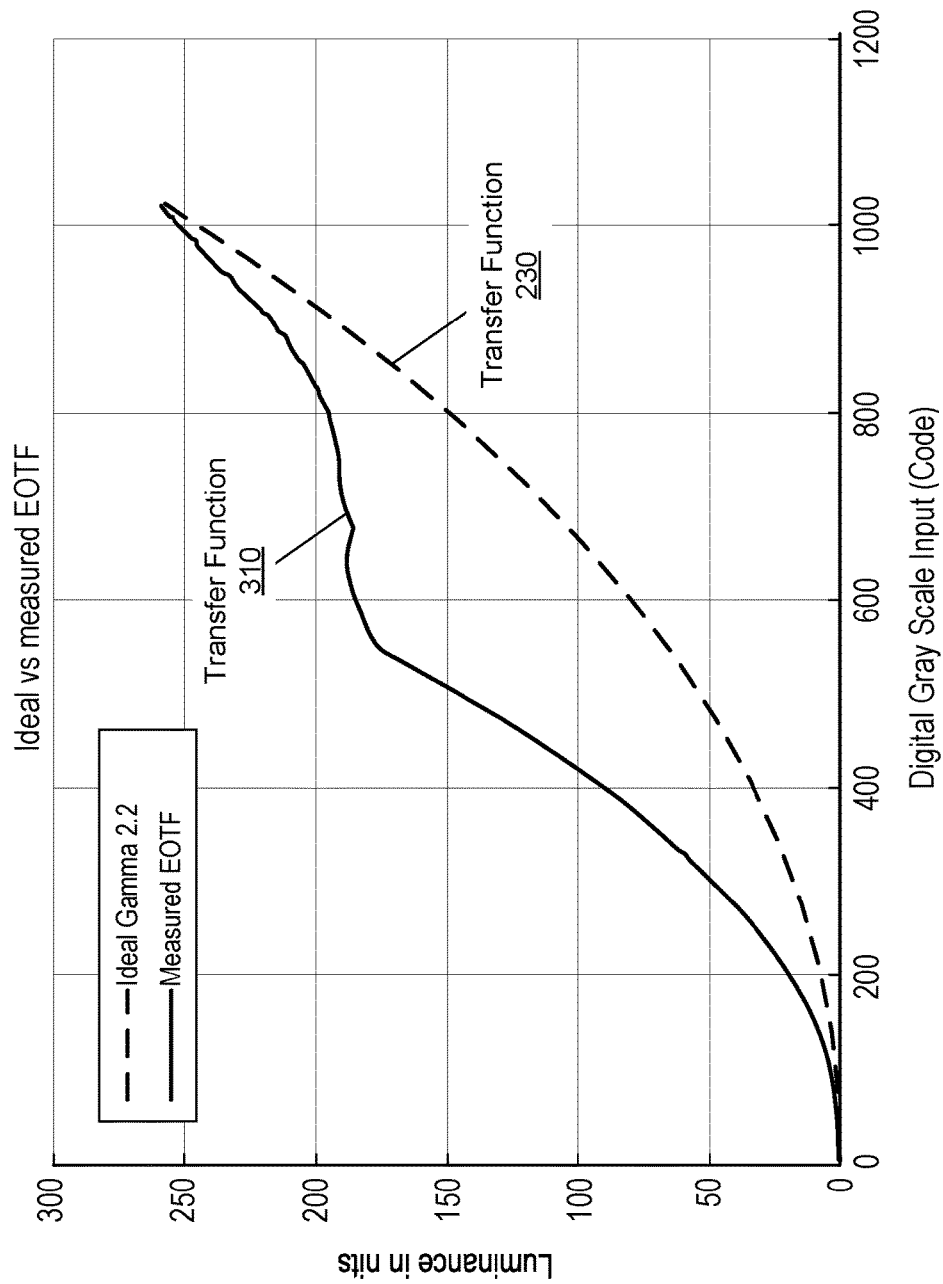
FIG. 3 is a generalized diagram of transfer functions.

Turning now to FIG. 3, a generalized diagram is shown of transfer functions 300. Transfer functions previously described are numbered identically. Transfer functions 300 includes electro-optical transfer functions (EOTFs) 310 and 230. The x-axis includes codes with a data size of 10 bits, rather than 8 bits. Therefore, the codes range from a minimum code of 0 to a maximum code of 1,023. Transfer function 310 is an EOTF for a display device under test (display DUT) that provides a different peak luminance based on a changing APL. In an implementation, transfer function 310 is provided by an OLED display device under test. During a certification process, comparisons between transfer functions 310 and 230 provide results that fail the display DUT. However, it is possible that the display DUT functions properly, and the failure results are due to the changing peak luminance of the display DUT based on the amount of power to consume for a changing APL. The luminance values of transfer function 310 can actually follow the gamma 2.2 EOTF at particular code values (particular APLs) when the changing peak luminance is considered.

Figure 4:
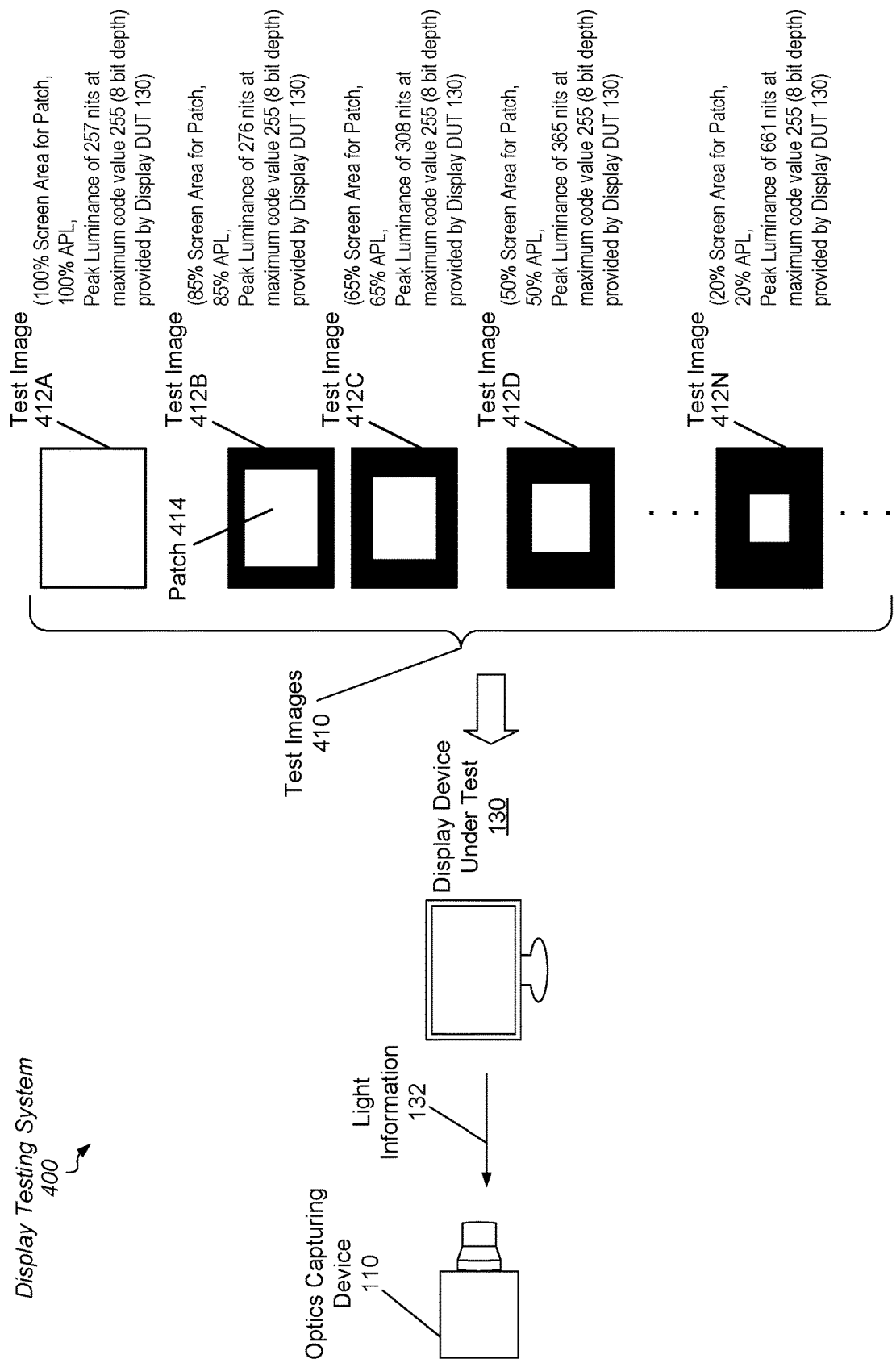
FIG. 4 is a generalized diagram of a display testing system.

Referring to FIG. 4, a generalized diagram is shown of a display testing system 400. Circuitry and components described previously are numbered identically. Optics capturing device 110 receives light information 132 from display device under test (DUT) 130. As described earlier, optics capturing device 110 can be incorporated within a measurement device such as measurement device 142 (of FIG. 1). Test images 410 include test images 412A-412N and these test images are provided to the display DUT 130. Test image 412A is a full screen with a white level. Multiple test images of test images 412B-412N include a patch surrounded by a black border. The patch includes a geometric shape filled with a white level. Here, the geometric shape is a rectangle. For example, test image 412B has patch 414 that consumes 85% of the screen area. Although not shown, it is possible that one of the test images 412B-412N is a full screen with a black level.

As the size of the patch changes for each of the test images, the APL also changes. Test image 412C has a patch that consumes 65% of the screen area and the APL for test image 412C is 65%, and so on for the remainder of the test images. Although particular values for the percentage of the screen area and corresponding APL are shown, it is possible and contemplated that other values are used.

In some implementations, display DUT 130 is an organic light-emitting diode (OLED) display. Display DUT 130 regulates power consumption based on the APL of the test image of the test images 410 to be displayed on the screen. When the APL is low, such as for test image 412N, display DUT 130 (OLED device) provides a higher maximum luminance value without consuming an appreciable amount of power. As shown, display DUT 130 (OLED device) provides a peak luminance value of 661 nits for test image 412N with 20% APL. When the APL is high, display DUT 130 (OLED device) provides a lower maximum luminance value to regulate the amount of power consumption. As shown, display DUT 130 (OLED device) provides a peak luminance value of 257 nits for test image 412A with 100%

APL. The peak luminance provided by display DUT 130 for other test images with APL values between 20% and 100% are shown. The varying peak luminance values cause a certification process for display DUT 130 to require a new reference EOTF. The selected and provided APL and corresponding measured peak luminance values are stored in a table such as fields 714 and 719 of table 710 (of FIG. 7). Further details are provided in the description of apparatus 700 (of FIG. 7).

Figure 5:
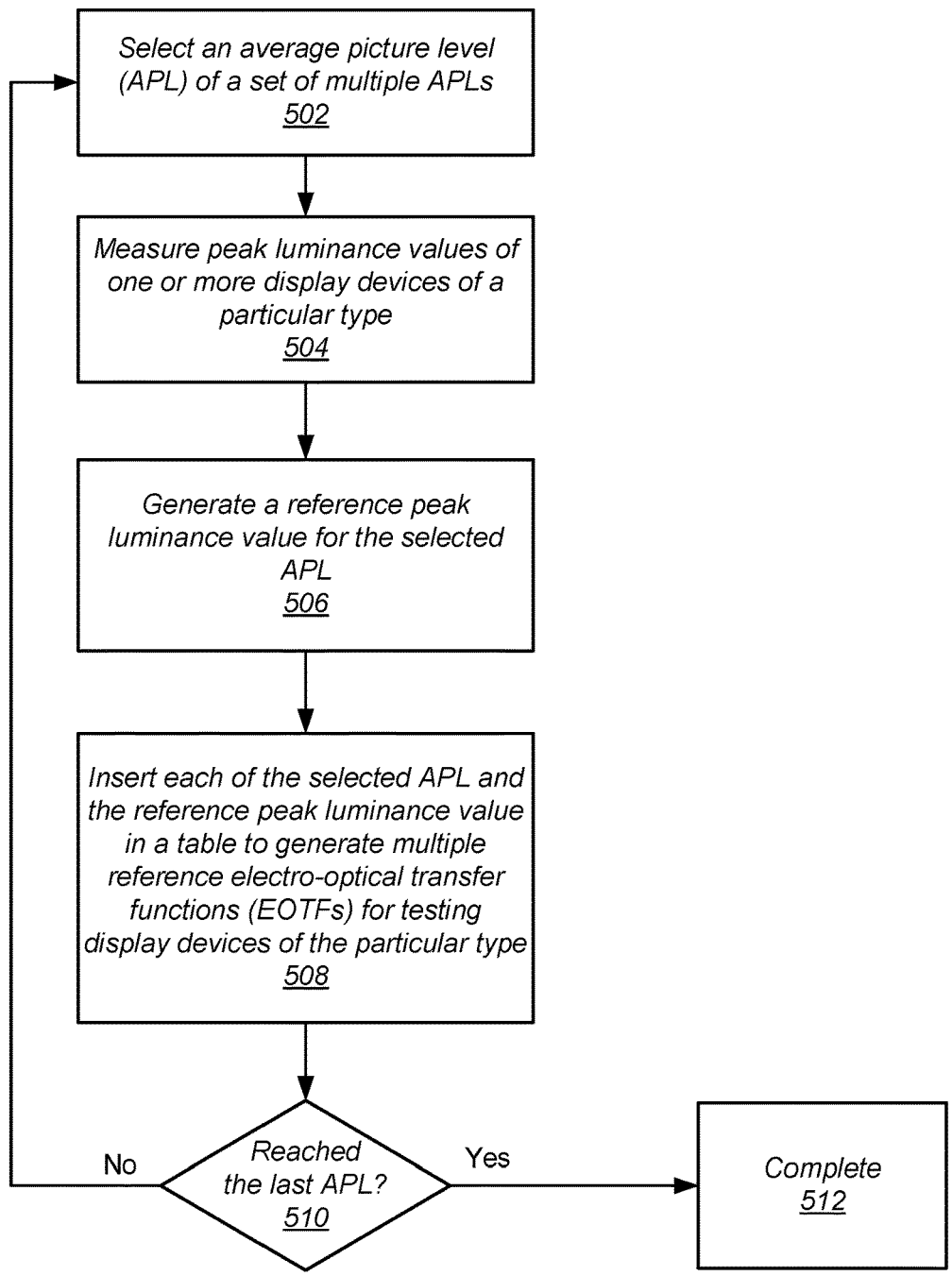
FIG. 5 is a generalized diagram of a method for generating reference transfer functions used during a certification process.

Referring to FIG. 5, a generalized diagram is shown of a method 500 for adjusting reference transfer functions used during a certification process. For purposes of discussion, the steps in this implementation (as well as FIGS. 9 and 11) are shown in sequential order. However, in other implementations some steps occur in a different order than shown, some steps are performed concurrently, some steps are combined with other steps, and some steps are absent.

In some implementations, a vendor that manufactures the display devices provides measurement information of the display devices. In other implementations, the vendor provides one or more display devices as reference display devices to generate the measurement information for the characterization table. During a calibration process, a measurement device builds a characterization table such as table 710 of apparatus 700 (of FIG. 7). To do so, the measurement device selects an average picture level (APL) of a set of multiple APLs (block 502). In some implementations, an optics capturing device and the measurement device measure peak luminance values of one or more display devices of a particular type (block 504). These one or more display devices are the display devices from the vendor to use as reference display devices. In various implementations, the particular type is an OLED display type, which regulates power consumption based on the APL of the test image to be displayed on the screen. Therefore, the display device has multiple peak luminance values, each for a corresponding APL. The measurement device generates a reference peak luminance value for the selected APL (block 506). To do so, a test image that provides the selected APL is presented on the screen of the display device. In some implementations, the test images include a rectangular patch of a particular size providing a white level and the patch is surrounded by a black border. Examples of these test images are test images 412A-412N (of FIG. 4).

The measurement device inserts each of the selected APL and the reference peak luminance value in a table to generate points along a new reference electro-optical transfer function (EOTF) for testing display devices of the particular type (block 508). If the last APL has not yet been reached ("no" branch of the conditional block 510), then control flow of method 500 returns to block 502 where the measurement device selects an average picture level (APL) of a set of multiple APLs. If the last APL has been reached ("yes" branch of the conditional block 510), then the measurements complete (block 512). The selected and provided APL and corresponding measured peak luminance values are stored in a table such as fields 714 and 719 of table 710 (of FIG. 7). Further details are provided in the description of apparatus 700 (of FIG. 7).

Figure 6:
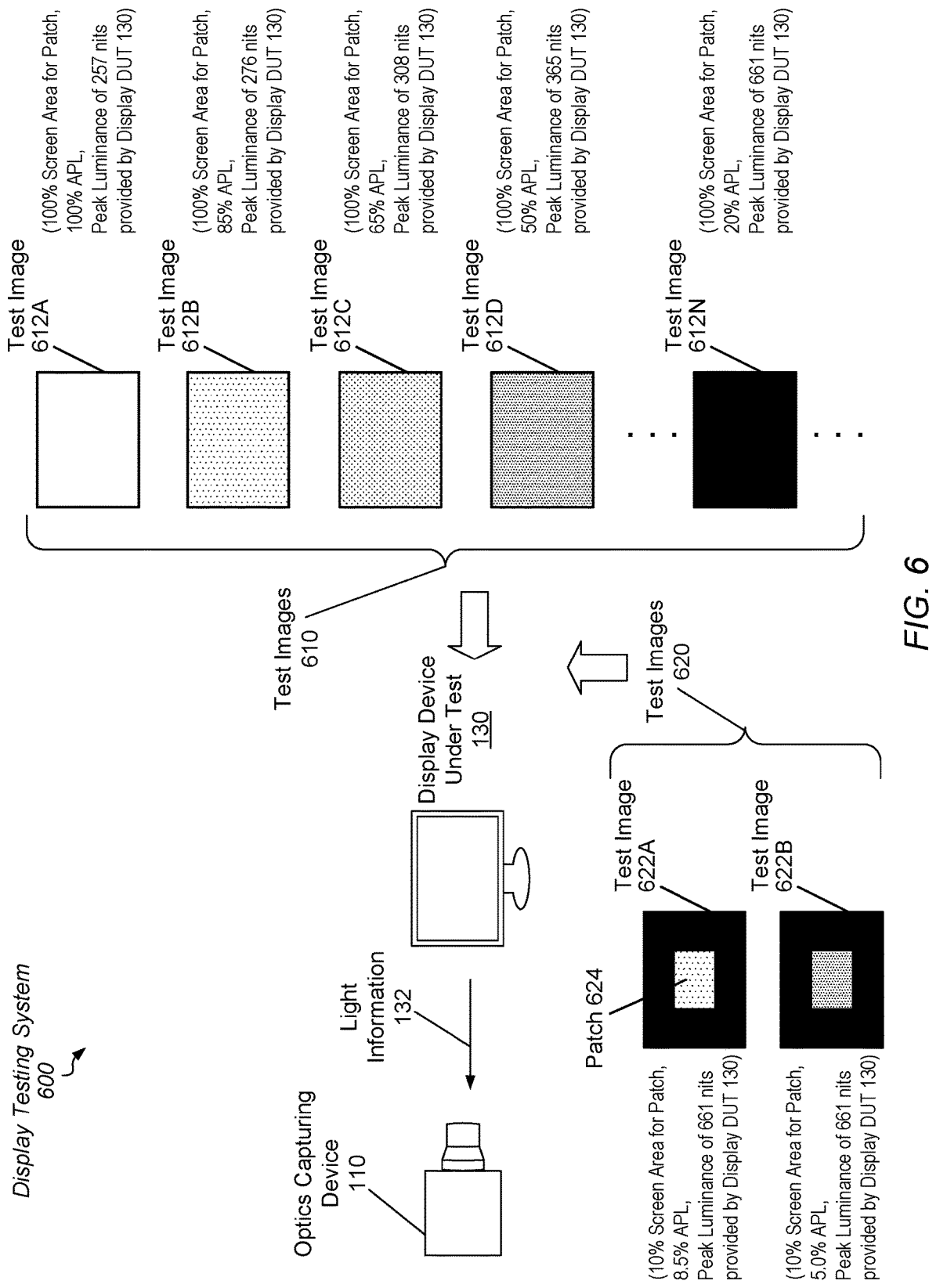
FIG. 6 is a generalized diagram of a display testing system.

Referring to FIG. 6, a generalized diagram is shown of a display testing system 600 that adjusts reference transfer functions used during a certification process. Circuitry and components described previously are numbered identically. Optics capturing device 110 receives light information 132 from display device under test (DUT) 130. As described earlier, optics capturing device 110 can be incorporated within a measurement device such as measurement device 142 (of FIG. 1). At least the multiple test images 610 and test images 620 are provided to the display DUT 130. Test images 610 includes test images 612A-612N and test images 620 include test images 622A-622B. Each of the test images 612A-612N has a different amount of power consumed to generate the test image on the screen of display DUT 130 based on the amount of white level being shown. In some implementations, the amount of white level being shown, and the corresponding amount of power consumed is indicated by an APL value. It is noted that the different shadings used in test images 612A-612N includes dots, but the shadings are intended to indicate different uniform white levels (or gray levels) on the screen of display DUT 130. The dots do not actually exist in the test images 612A-612N provided on the screen of display DUT 130. Rather, the dots are used in the illustrated implantation to indicate different gray levels.

Each of the test images 622A-622B uses 10% of the screen area of display DUT 130 to present a patch on the screen of display DUT 130. The patch, such as patch 624 of test image 622A, includes a geometric shape filled with a particular gray level. Here, the geometric shape is a rectangle. Each of the test images 612A-612N uses 100% of the screen area of display DUT 130 to present a patch on the screen of display DUT 130. Therefore, the patches of the test images 612A-612N utilize no black border as shown for test images 622A-622B. The patches of the test images 612A-612N occupy the entire screen area of display DUT 130.

Although a particular number of test images 612A-612N and test images 622A-622B are shown with particular characteristics (e.g., percentage of screen area for patch, particular APL), in other implementations, another number of test images and other characteristics are used during certification of display DUT 130. As shown, test image 612A has 100% APL based on providing the highest white level. Test image 612B has 85% APL, which is a lower amount of white level than test image 612A, but still much higher than other test images. The other test images of test images 610 and test images 620 have their respective white levels.

As described earlier, display DUT 130 can be an organic light-emitting diode (OLED) display. Display DUT 130 regulates power consumption based on the APL of the test image of the test images 610 to be displayed on the screen. When the APL is low, such as for test image 612N, and display DUT 130 is an OLED display device, display DUT 130 provides a higher maximum luminance value without consuming an appreciable amount of power. As shown, when display DUT 130 is an OLED display device, display DUT 130 provides a peak luminance value of 661 nits for test image 612N with 20% APL. When the APL is high, and display DUT 130 is an OLED display device, display DUT 130 provides a lower maximum luminance value to regulate the amount of power consumption. As shown, when display DUT 130 is an OLED display device, display DUT 130 provides a peak luminance value of 257 nits for test image 612A with 100% APL. The peak luminance provided by display DUT 130 for other test images 612B-612D with APL values between 20% and 100% are shown.

Figure 7:
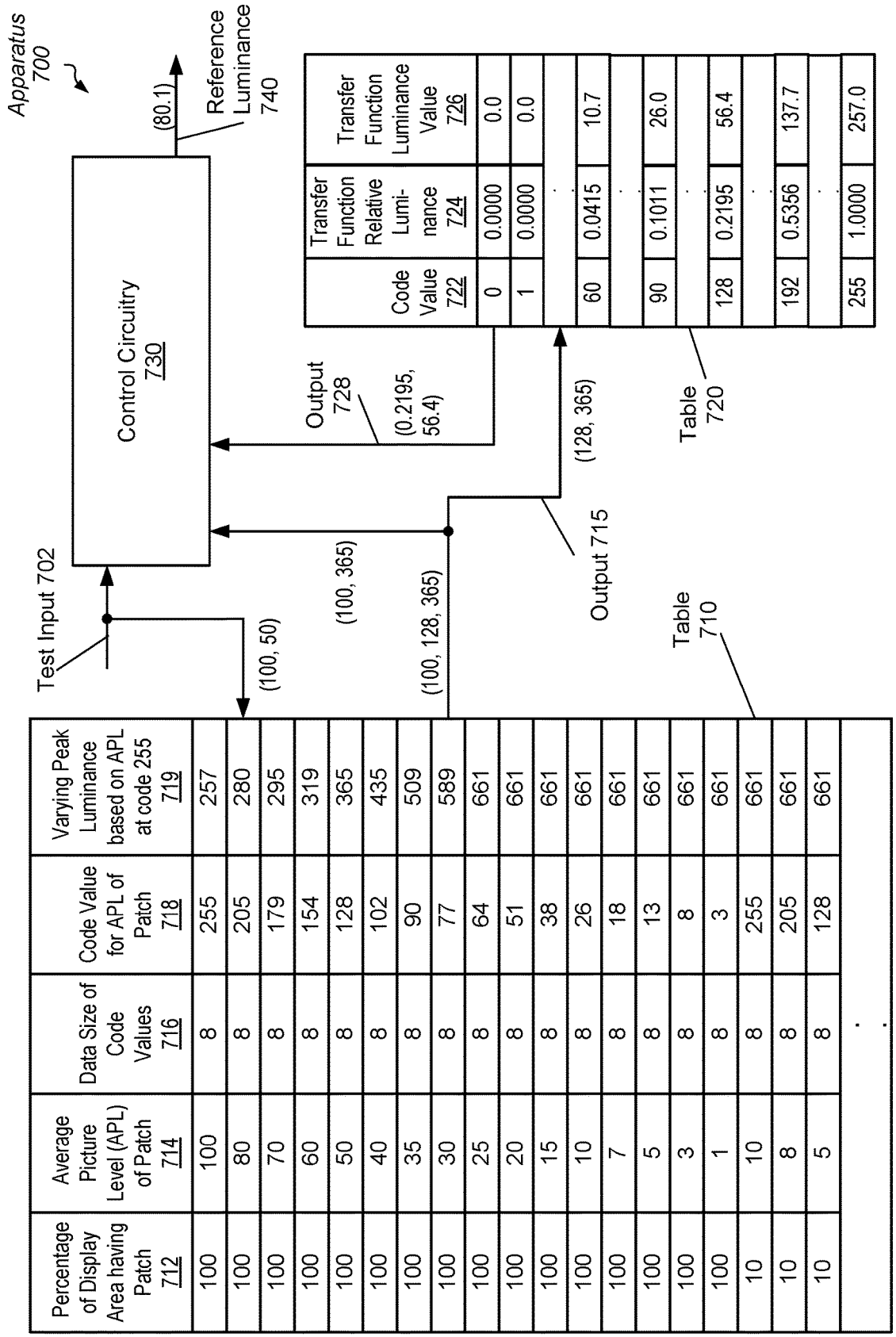
FIG. 7 is a generalized diagram of an apparatus that generates a new reference transfer function used during a certification process.

Referring to FIG. 7, a generalized diagram is shown of an apparatus 700 that generates a new reference transfer function used during a certification process. In the illustrated implementation, apparatus 700 includes control circuitry 730, table 710 and table 720. Table 710 stores information in multiple table entries, each with the fields 712-719. Table 720 stores information in multiple table entries, each with the fields 722-726. In various implementations, the functionality provided by apparatus 700 is also provided by the circuitry of the processing circuit 150 (of FIG. 1), which is included in one or more of the measurement devices 142 and 144, when executing instructions of peak luminance adjuster 166. The control circuitry 730 receives the test input 702 and information from the tables 710 and 720 and generates the reference luminance 740. The reference luminance 740 is a luminance value of a reference transfer function. In an implementation, the reference transfer function defined by the information of table 720 is transfer function 810 (of FIG. 8). The reference luminance 740 is compared to luminance values provided by the display device under test (display DUT) during a certification process of the display DUT. The display DUT is a particular type of display device. In various implementations, the display DUT is an OLED display device that regulates power consumption based on the APL of the image to be displayed on the screen. In other implementations, the display DUT is another display device type.

Each of tables 710 and 720 is implemented with one of flip-flop circuits, one of a variety of types of a random-access memory (RAM), a content addressable memory (CAM), or other. In some implementations, the information stored in table 710 is generated from one or more display devices received from the vendor to use as reference display devices. When multiple display devices are used as reference display devices, the information stored in field 719 of table 710 are average values of the values generated by the multiple reference display devices from the vendor.

Although particular information is shown as being stored in tables 710 and 720, and in a particular contiguous order, in other implementations, a different order is used, and a different number and type of information is stored. Field 712 of table 710 stores an indication specifying a percentage of display area of a screen having a patch of a test image. As shown in field 712, the patch of the test image can occupy 100% of the screen of the display DUT. The patch, such as patch 624 (of FIG. 4), includes a geometric shape such as a square or rectangle that can occupy a particular percentage of the screen of the display DUT. When the patch does not occupy 100% of the screen of the display DUT, the test image further includes a black border around the geometric shape of the patch. During a certification process, the screen percentages for the patch are typically 100% and 10%, although other percentages are possible and contemplated. Field 714 stores an APL of the patch. Field 716 stores a data size (or bit depth) of digital codes.

Field 718 stores a code value corresponding to the APL of the patch stored in field 714. Field 719 stores a peak luminance provided by the display DUT when a test image includes values stored in fields 712-714. In an implementation, the peak luminance values were obtained using the display testing system 400 and test images 410 (of FIG. 4). In an implementation, the second entry from the top of table 710 stores a percentage of display area of a screen having the patch as 100% and field 714 stores an APL value of 80%. The resulting code value corresponding to the APL of the patch stored in this entry is 205 and the peak luminance stored in this entry is 280 nits. Therefore, for the type of display DUT going through the certification process, this type of display device DUT provides a peak luminance of 280 nits when the test image utilizes 100% of the screen area of the display DUT and the APL is set at 80%. As shown, the peak luminance values (field 719) changes based on both the changing APL (field 714) and the changing percentage of display area of a screen (field 712) presenting the patch of the test image. When the display DUT is an OLED display device, the display device regulates power consumption based on the APL of the image to be displayed on the screen. This regulation of power consumption causes the changes of the peak luminance values of field 719 based on changes in values stored in fields 712 and 714.

Field 722 of table 720 stores a digital code of an EOTF. Field 724 stores a relative luminance value corresponding to the code stored in field 722 of the same table entry. However, field 724 stores relative luminance values of a reference EOTF. Field 726 stores a luminance value corresponding to the code stored in field 722 of a same table entry after adjustment of the relative luminance value using a particular one of the peak luminance values stored in field 719 in one of the entries of table 710. In the illustrated implementation, the peak luminance value is 257 nits. However, it is possible and contemplated that table 720 includes other fields corresponding to other peak luminance values used to adjust the relative luminance value stored in field 724. For example, the peak luminance value of 295 nits in the third entry of table 710 can be used.

In the illustrated example, test input 702 indicates a 100% display area of the screen present the patch of the test image and the APL is 50%. These values are used as an index to search table 710. In other implementations, control circuitry 730 generates interpolated values from table 710 when the test input 702 does not include values that hit entries in table 710. The output 715 of table 710 includes the code of 128 from field 718 and the peak luminance of 365 nits from field 719. The code value 128 of output 715 is used as an index to search table 720. The output 728 of table 720 includes the relative luminance value of 0.5257 nits from field 724 and the luminance of 135.1 nits from field 726. Control circuitry 730 generates the reference luminance 740 as 80.1 nits. In an implementation, control circuitry 730 generates this output value of 80.1 nits by multiplying the luminance value 56.4 nits from field 726 of table 520 by the ratio of peak luminance values of tables 710 and 720. The ratio is 365 nits from field 719 of table 710 divided by 257 nits from field 726 of table 720 corresponding to the code 255. The ratio is 1.42 (365 nits/257 nits), and the product is 80.1 nits (56.4 nits×1.42).

In another implementation, control circuitry 730 generates this output value of 80.1 nits by multiplying the peak luminance of 365 nits from field 719 of table 710 by the relative luminance value of 0.2195 nits from field 724 of table 720. This product is 80.1 nits (365 nits×0.2195). The reference luminance 740 is used to generate a new reference transfer function such as transfer function 810 (of FIG. 8). The reference luminance 740 is compared to luminance values of provided by the display device during a certification process of the display device.

Figure 8:
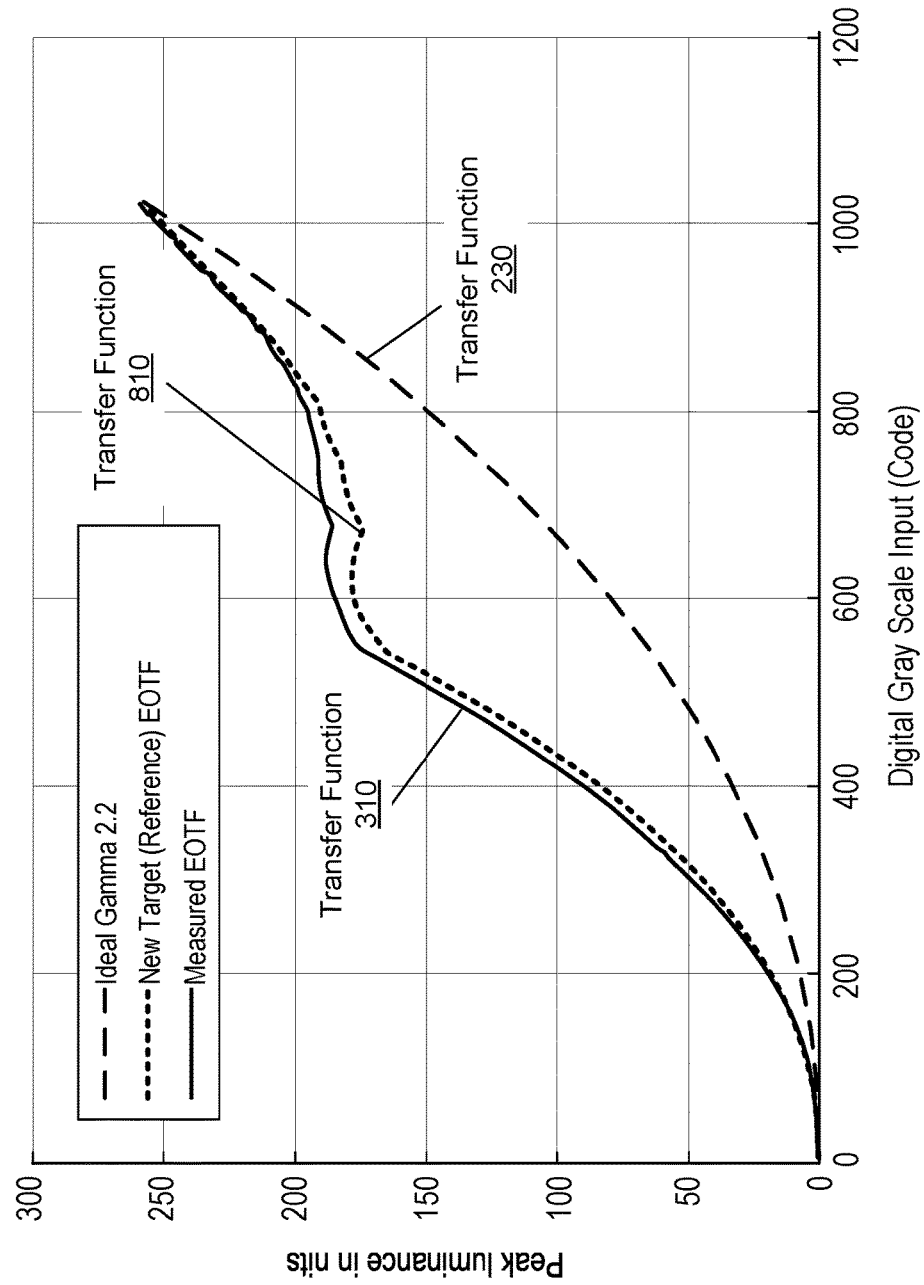
FIG. 8 is a generalized diagram of transfer functions.

Turning now to FIG. 8, a generalized diagram is shown of transfer functions 800. Transfer functions previously described are numbered identically. Transfer functions 800 includes electro-optical transfer functions (EOTFs) 810, 310 and 230. Transfer function 310 is an EOTF for a display device under test (display DUT) that provides a different peak luminance based on the amount of power to consume for a changing APL. In an implementation, transfer function 310 is provided by an OLED display DUT. Transfer function 810 is a reference EOTF. In some implementations, transfer function 810 is generated by apparatus 700 (of FIG. 7). During a certification process, comparisons between transfer functions 310 and 810 provide results that can pass the display device, since transfer function 810 accounts for the display device changing peak luminance of the display device based on the amount of power to consume for a changing APL.

Figure 9:
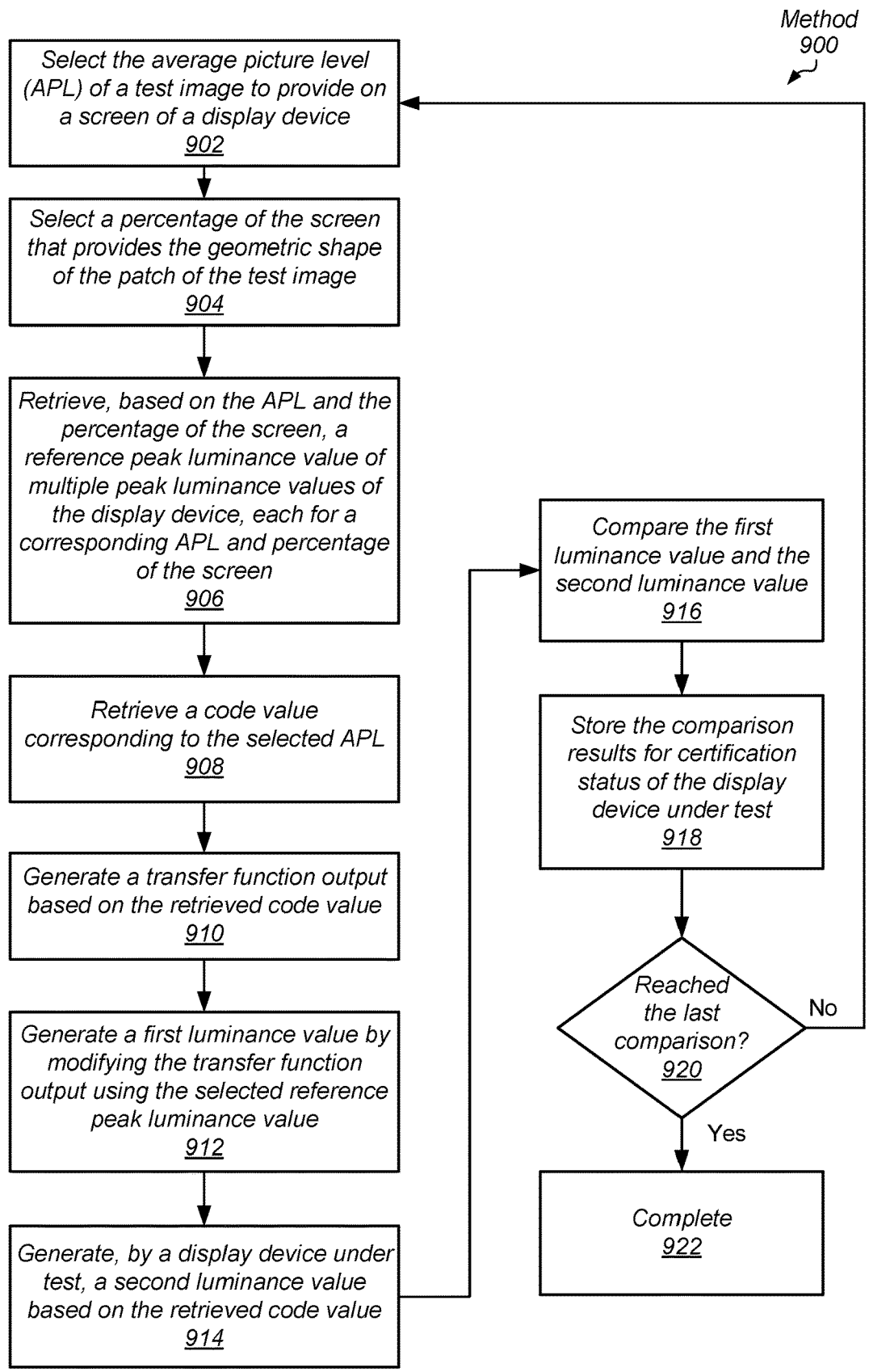
FIG. 9 is a generalized diagram of a method for generating a new reference transfer function used during a certification process.

Turning now to FIG. 9, a generalized diagram is shown of a method 900 for adjusting reference transfer functions used during a certification process. During a calibration process, a measurement device selects the average picture level (APL) of a test image to be provided on a screen of a display device (block 902). The measurement device selects a percentage of the screen that provides the test image (block 904). The measurement device retrieves, based on the APL and the percentage of the screen, a reference peak luminance value of multiple peak luminance values of the display device, each for a corresponding APL and percentage of the screen (block 906). In various implementations, the measurement device accesses a table or other data structure to retrieve this information. In an implementation, the measurement device accesses data structures similar to table 710 and table 720 (of FIG. 7). The measurement device retrieves a code value corresponding to the selected APL (block 908). The measurement device generates a transfer function output based on the retrieved code value (block 910). In some implementations, the transfer function output is a relative luminance value of a reference EOTF. In an implementation, the measurement device accesses field 724 of table 720 (of FIG. 7).

The measurement device generates a first luminance value by modifying the transfer function output using the selected reference peak luminance value (block 912). In an implementation, the measurement device multiplies the relative luminance value by the retrieved peak luminance value. As described earlier, in an implementation, control circuitry 730 (of FIG. 7) generates the reference luminance value of 80.1 nits by multiplying the peak luminance of 365 nits from field 719 of table 710 by the relative luminance value of 0.2195 nits from field 724 of table 720. This product is 80.1 nits (365 nits×0.2195). Afterward, the measurement device generates, by a display device under test, a second luminance value based on the retrieved code value (block 914). The measurement device compares the first luminance value and the second luminance value (block 916). The measurement device stores the comparison results for certification status of the display device under test block 918). If the last comparison has not yet been reached ("no" branch of the conditional block 920), then control flow of method 900 returns to block 902 where the measurement device selects the average picture level (APL) of a test image to provide on a screen of a display device. If the last comparison has been reached ("yes" branch of the conditional block 920), then the calibration process completes (block 922).

Figure 10:
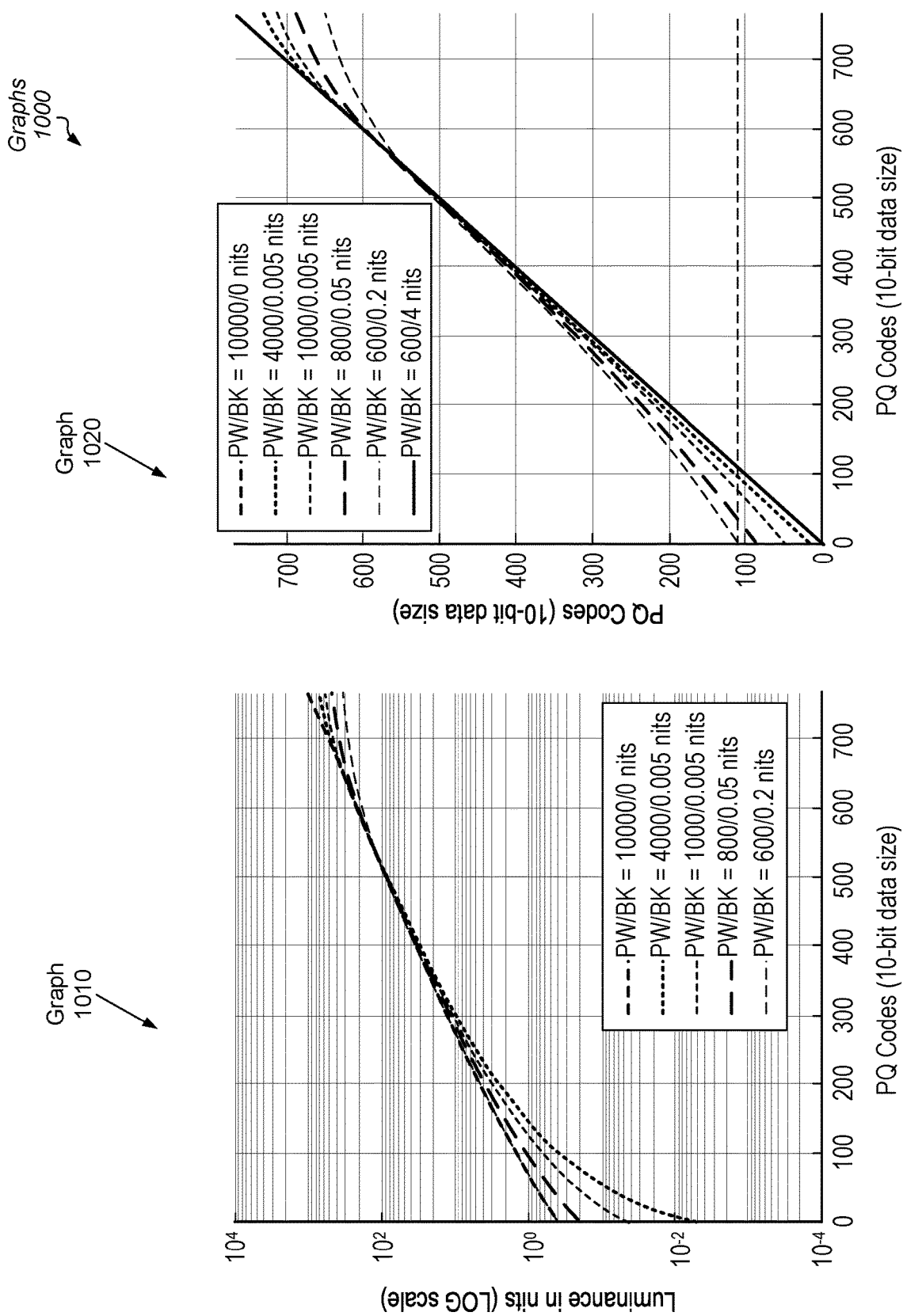
FIG. 10 is a generalized diagram of graphs that illustrates luminance level ranges of multiple display devices.

Referring to FIG. 10, a generalized diagram is shown of graphs 1000 that illustrate luminance level ranges of multiple display devices. Graphs 1000 include graph 1010 and graph 1020. Each of graph 1010 and graph 1020 illustrates luminance values of an EOTF generated from an ideal PQ EOTF and a device EOTF provided by a display DUT. It is known that presently used, or modern, display devices do not provide a maximum luminance of 10,000 nits. Accordingly, presently used display devices are not able to represent some of the luminance values that are encoded in a corresponding video frame. Therefore, a certification process does not fail the display DUTs for not having a maximum luminance of 10,000 nits at PQ code 1,023. However, it is not yet known whether the display DUTs should fail due to providing a non-zero luminance at PQ code 0. To handle this situation, the new reference EOTF is generated and used. As described earlier, processing circuit 150 of display testing system 100 (of FIG. 1) generates the new reference EOTF when executing the instructions of black level adjuster 164.

Graph 1010 includes multiple PQ EOTFs. The y-axis of graph 1010 measures luminance in units of nits, and a logarithmic scale is used to illustrate the measured luminance on the y-axis. The x-axis of graph 1010 includes PQ codes as 10-bit values. The maximum luminance (white level), which is indicated as "PW," is illustrated for each of the multiple PQ EOTFs. Additionally, the minimum luminance (black level), which is indicated as "BK," is illustrated for each of the multiple PQ EOTFs. The multiple PQ EOTFs include the ideal PQ EOTF with a maximum luminance of 10,000 nits and a minimum luminance of 0 nits. Each of the other EOTFs of a variety of display devices has a maximum luminance less than 10,000 nits. For example, graph 1010 includes four EOTFs with maximum luminance values of 600 nits, 800 nits, 1,000 nits, and 4,000 nits. Each of these other EOTFs of the variety of display devices has a minimum luminance near 0 nits.

For example, graph 1010 includes four PQ EOTFs of display DUTs with minimum luminance values of 0.2 nits, 0.5 nits, and 0.005 nits. These near-zero minimum luminance values were generated using the EETF equations and inserted in the newly generated EOTFs for the four display DUTs.

Graph 1020 includes the same multiple PQ EOTFs and an additional PQ EOTF of a display DUT generated by the display DUT without modification using the above EETF equations. This PQ EOTF has a peak luminance of 600 nits at PQ code 1,023 and a minimum luminance of 4 nits at PQ code 0. The x-axis of graph 1010 includes PQ codes as 10-bit values. The y-axis of graph 1020 illustrates the PQ codes of the display DUTS at particular luminance values of the ideal PQ EOTF. For example, the ideal PQ EOTF has a luminance value of L1 at PQ code 650. The multiple display DUTS reach the luminance value L1 at different PQ codes. These different PQ codes are found at the different transfer functions at PQ code 650 on the y-axis. At times, a certification process generates the set the pass/fail result based on a different in PQ codes as shown in graph 1020, rather than a different in luminance as shown in graph 1010.

Figure 11:
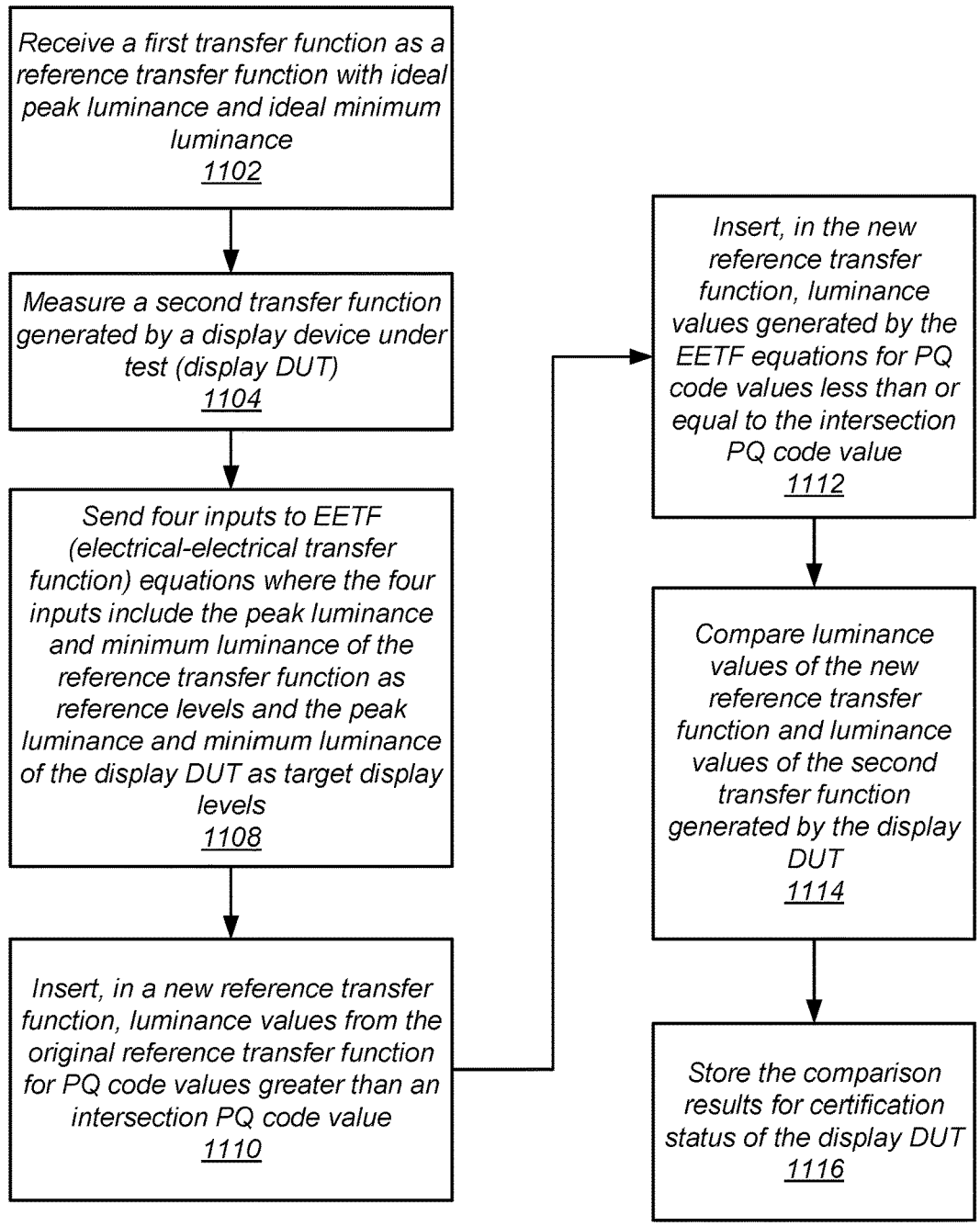
FIG. 11 is a generalized diagram of a method for adjusting reference transfer functions used during a certification process.

Referring to FIG. 11, a generalized diagram is shown of a method 1100 for adjusting reference transfer functions used during a certification process. Circuitry of a processing circuit of a measurement device receives a first transfer function as a reference transfer function with ideal peak luminance and ideal minimum luminance (block 1102). In an implementation, the reference transfer function is the ideal PQ EOTF. The circuitry measures a second transfer function generated by a display device under test (display DUT) (block 1104). The circuitry sends four inputs to EETF (electrical-electrical transfer function) equations where the four inputs include the peak luminance and minimum luminance of the original reference transfer function (ideal PQ EOTF) as reference levels and the peak luminance and minimum luminance of the display DUT as target display levels (block 1108). In various implementations, the EETF equations are set by the Recommendation ITU-R BT.1886 or the Recommendation ITU-R BT.2390-11.

The output of the EETF equations provides another transfer function (luminance values versus code values). In some implementations, the circuitry calculates an intersection PQ code value as the PQ code value where a difference between a luminance value of the original reference transfer function (ideal PQ EOTF) at the intersection PQ code value and a luminance value of the output of the EETF equations at the intersection PQ code value is less than a threshold. In other implementations, the circuitry calculates the intersection PQ code value as the PQ code value where a difference between a luminance value of the original reference transfer function (ideal PQ EOTF) at the intersection PQ code value and a luminance value of the output of the EETF equations at the intersection PQ code value provides a smaller difference than any difference between luminance values calculated of at any other PQ code value. The circuitry generates a new reference transfer function by inserting, in the new reference transfer function, luminance values from the original reference transfer function (ideal PQ EOTF) for code values greater than the intersection PQ code value (block 1110).

The circuitry continues to generate the new reference transfer function by inserting, in the new reference transfer function, luminance values generated by the EETF equations for PQ code values less than or equal to the intersection PQ code value (block 1112). At one or more PQ code values, the circuitry compares luminance values of the new reference transfer function and luminance values of the second transfer function generated by the display DUT (block 1114). The circuitry stores the comparison results for certification status of the display device under test (block 1116). It is noted that in other implementations, the circuitry uses another transfer function other than the ideal PQ EOTF as the original reference transfer function. For example, the circuitry sends four inputs to the EETF (electrical-electrical transfer function) equations where the four inputs include the peak luminance and minimum luminance of the original reference transfer function (ideal PQ EOTF) as reference levels. The circuitry also sends the peak luminance of the display DUT and the minimum luminance of the original reference transfer function (ideal PQ EOTF) as target display levels. The output of the EETF equations provides another transfer function (luminance values versus code values), which is used as the original reference transfer function when finding the intersection PQ code value. This output of the EETF equations is also used for inserting luminance values into the new reference transfer function for PQ codes greater than the intersection PQ code value.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   circuitry configured to:
   receive a first plurality of luminance values of a first electro-optical transfer function (EOTF) having a same peak luminance value across a plurality of average picture levels (APLs);
   generate, based at least in part on the first EOTF, a second plurality of luminance values for a second EOTF characterizing a first reference display device, wherein two or more of the second plurality of luminance values have different peak luminance values at corresponding APLs; and
   store the second plurality of luminance values of the second EOTF.

2. The apparatus as recited in claim 1, wherein the first EOTF is a reference EOTF utilizing gamma correction.

3. The apparatus as recited in claim 1, wherein the circuitry is further configured to generate the second plurality of luminance values by multiplying peak luminance values of the first reference display device and the first plurality of luminance values of the first EOTF across a plurality of APLs, wherein each of the peak luminance values and the first plurality of luminance values is dependent on APL.

4. The apparatus as recited in claim 3, wherein the circuitry is further configured to receive at least two different peak luminance values generated by the first reference display device while displaying a plurality of test images, each test image having a corresponding APL.

5. The apparatus as recited in claim 4, wherein the at least two different peak luminance values generated by the first reference display device are further dependent on a percentage of a screen of the first reference display device used to display white level patches of the plurality of test images.

6. The apparatus as recited in claim 1, wherein the circuitry is further configured to generate a third plurality of luminance values of a third EOTF for verifying black levels of a second reference display device by using a minimum luminance value and a maximum luminance value of an ideal Perceptual Quantizer (PQ) EOTF as inputs to electrical-electrical transfer function (EETF) equations.

7. The apparatus as recited in claim 6, wherein the circuitry is further configured to generate the third plurality of luminance values of a third EOTF by using a minimum luminance value and a maximum luminance value of the second reference display device as inputs to the EETF equations.

8. A method comprising:
receiving, by circuitry of a measurement device, a first plurality of luminance values of a first electro-optical transfer function (EOTF) having a same peak luminance value across a plurality of average picture levels (APLs);
generating, by the circuitry based at least in part on the first EOTF, a second plurality of luminance values for a second EOTF characterizing a first reference display device, wherein two or more of the second plurality of luminance values have different peak luminance values at corresponding APLs; and
storing, by the circuitry, the second plurality of luminance values for later use during a certification process of one or more display devices of a same type as the first reference display device.

9. The method as recited in claim 8, wherein the first electro-optical transfer function (EOTF) is a reference EOTF utilizing gamma correction.

10. The method as recited in claim 8, further comprising generating, by the circuitry, the second plurality of luminance values by multiplying peak luminance values of the first reference display device and the first plurality of luminance values of the first EOTF across a plurality of APLs, wherein each of the peak luminance values and the first plurality of luminance values is dependent on APL.

11. The method as recited in claim 10, further comprising receiving, by the circuitry, at least two different peak luminance values generated by the first reference display device while displaying a plurality of test images, each test image having a corresponding APL.

12. The method as recited in claim 11, wherein the at least two different peak luminance values generated by the first reference display device are further dependent on a percentage of a screen of the first reference display device used to display white level patches of the plurality of test images.

13. The method as recited in claim 8, further comprising generating, by the circuitry, a third plurality of luminance values of a third EOTF for verifying black levels of a second reference display device by using a minimum luminance value and a maximum luminance value of an ideal Perceptual Quantizer (PQ) EOTF as inputs to electrical-electrical transfer function (EETF) equations.

14. The method as recited in claim 13, further comprising generating, by the circuitry, the third plurality of luminance values of a third EOTF by using a minimum luminance value and a maximum luminance value of the second reference display device as inputs to the EETF equations.

15. A system comprising:
a memory device; and
circuitry configured to:
receive a first plurality of luminance values of a first electro-optical transfer function (EOTF) having a same peak luminance value across a plurality of average picture levels (APLs);
generate, based at least in part on the first EOTF, a second plurality of luminance values for a second EOTF characterizing a first reference display device, wherein two or more of the second plurality of luminance values have different peak luminance values at corresponding APLs; and
store the second plurality of luminance values of the second EOTF in the memory device.

16. The system as recited in claim 15, wherein the first electro-optical transfer function (EOTF) is a reference EOTF utilizing gamma correction.

17. The system as recited in claim 15, wherein the circuitry is further configured to generate the second plurality of luminance values by multiplying peak luminance values of the first reference display device and the first plurality of luminance values of the first EOTF across a plurality of APLs, wherein each of the peak luminance values and the first plurality of luminance values is dependent on APL.

18. The system as recited in claim 17, wherein the circuitry is further configured to receive at least two different peak luminance values generated by the first reference display device while displaying a plurality of test images, each test image having a corresponding APL.

19. The system as recited in claim 18, wherein the at least two different peak luminance values generated by the first reference display device are further dependent on a percentage of a screen of the first reference display device used to display white level patches of the plurality of test images.

20. The system as recited in claim 15, wherein the circuitry is further configured to generate a third plurality of luminance values of a third EOTF for verifying black levels of a second reference display device by using a minimum luminance value and a maximum luminance value of an ideal Perceptual Quantizer (PQ) EOTF as inputs to electrical-electrical transfer function (EETF) equations.

* * * * *